United States Patent [19]
Elsener et al.

[11] Patent Number: 5,862,047
[45] Date of Patent: Jan. 19, 1999

[54] POWER CONVERTER CIRCUIT ARRANGEMENT HAVING A PLURALITY OF PARALLEL POWER CONVERTERS OR POWER CONVERTER ARMS AND BALANCING INDUCTORS CONNECTED IN BETWEEN

[75] Inventors: Mathieu Elsener, Rheinfelden; Gernot Enzensberger, Wettingen, both of Switzerland

[73] Assignee: ABB Daimler-Benz Transportation (Technology) GmbH, Berlin, Germany

[21] Appl. No.: 965,862

[22] Filed: Nov. 7, 1997

[30] Foreign Application Priority Data

Dec. 12, 1996 [DE] Germany .................. 196 51 666.8

[51] Int. Cl.⁶ .......................... H02M 7/00; H02M 1/00
[52] U.S. Cl. .................. 363/65; 363/71; 307/82
[58] Field of Search ................. 363/65, 71, 72; 307/82

[56] References Cited

U.S. PATENT DOCUMENTS

| | | | |
|---|---|---|---|
| 4,149,233 | 4/1979 | Nagano | 363/71 |
| 4,447,695 | 5/1984 | Inoue | 363/71 |
| 4,742,442 | 5/1988 | Nilssen | 363/98 |
| 4,916,599 | 4/1990 | Traxler et al. | 363/65 |
| 5,245,525 | 9/1993 | Galloway et al. | 363/71 |
| 5,566,061 | 10/1996 | Uchino | 363/71 |
| 5,742,495 | 4/1998 | Barone | 363/65 |

FOREIGN PATENT DOCUMENTS

| | | |
|---|---|---|
| 4027969C1 | 11/1991 | Germany . |
| 4111733C1 | 9/1992 | Germany . |
| 682531 A5 | 9/1993 | Switzerland . |

*Primary Examiner*—Peter S. Wong
*Assistant Examiner*—Bao Q. Vu
*Attorney, Agent, or Firm*—Burns, Doane, Swecker & Mathis, L.L.P.

[57] ABSTRACT

A power converter circuit arrangement having a plurality of parallel power converters or power converter arms is specified, in which an effective uniform distribution of current can be achieved in a simple manner. This is achieved by virtue of the fact that balancing inductors which are arranged between two adjacent power converters comprise at least one ring core, and that the load connections of two adjacent power converters or power converter arms are looped through the ring cores from different sides and are brought together to a common load current connection of all of the parallel power converters or power converter arms.

4 Claims, 1 Drawing Sheet

POWER CONVERTER CIRCUIT ARRANGEMENT HAVING A PLURALITY OF PARALLEL POWER CONVERTERS OR POWER CONVERTER ARMS AND BALANCING INDUCTORS CONNECTED IN BETWEEN

BACKGROUND OF THE INVENTION

Field of the Invention

The invention relates to the field of power electronics. It is based on a power converter circuit arrangement according to the preamble of the first claim.

Discussion of Background

A circuit arrangement of the generic type is already described in Swiss Patent Specification CH 682 531 A5. That document specifies a power converter circuit arrangement having a plurality of converter elements connected in parallel. The power semiconductor switches of the converter elements are essentially driven in a synchronous manner. On account of switching time differences or different switching delays of the power semiconductor switches of different converter elements, the situation may arise where the switches of one converter element are still switched on, while those of another converter element are already switched off. As a result, the switches which are still switched on have to carry a higher current than those which are already switched off. This results in an unbalance in the current loads of the converter elements, which, in the extreme case, may lead to destruction of switches on account of thermal overloading.

In order to even out the current division between the converter elements, the abovementioned document proposes arranging balancing inductors between the converter elements and influencing the edges of the turn-on and turn-off commands of the power semiconductor switches by means of a regulating device in such a way that, ultimately, a uniform distribution of current results. In order to obtain an effective uniform distribution of current, however, the balancing inductors must be chosen to be fairly large, and the regulating arrangement also requires a considerable outlay.

SUMMARY OF THE INVENTION

Accordingly, one object of the invention is to provide a novel power conductor circuit arrangement having a plurality of parallel power converters or power converter arms in which an effective uniform distribution of current can be achieved in a simple manner. This object is achieved, for a circuit arrangement of the type mentioned in the introduction, by means of the features of the first claim.

The essence of the invention, then, is that the balancing inductors comprise at least one ring core and that the load connections of two adjacent power converters or power converter arms are looped through the ring core from different sides and are brought together to a common load current connection of all of the parallel power converters or power converter arms. If an unbalance occurs in the switching behavior of the power converters or power converter arms that are operated in parallel, then the ring-core inductors accept the differential voltage between the load connections of two adjacent power converters or power converter arms during the commutation of the load current to or from the freewheeling diodes of the power semiconductor switches. As a result, the arms are decoupled during commutation and the otherwise occurring incorrect distribution of the currents is reduced to a nondamaging extent.

The ring-core inductors preferably have a nonlinear inductance. The ring cores may be composed for example of a porous, soft-magnetic powder composite material or of rings of high permeability with an air gap.

Further exemplary embodiments emerge from the corresponding dependent claims.

The advantage of the structure according to the invention consists in the fact that an effective uniform distribution of current is achieved in a simple manner, and that remaining incorrect distributions of current are taken up by the ring-core inductors. As a result, the entire power converter circuit arrangement can be produced considerably more cheaply and with less technical outlay compared with the prior art.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
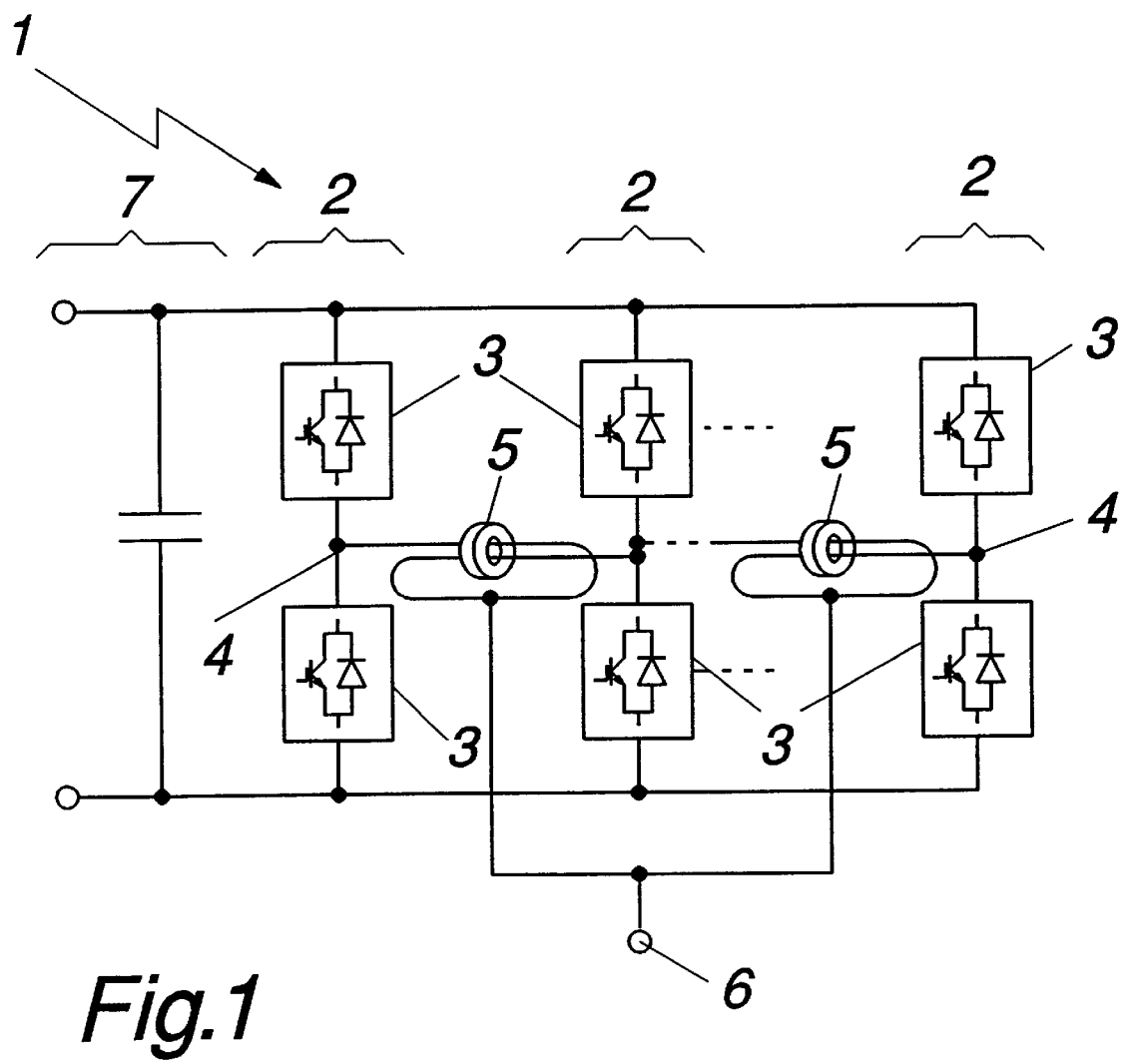
FIG. 1 shows a diagrammatic illustration of the invention.

The reference numerals used in the drawings and their meanings are summarized in the List of Designations.

DESCRIPTION OF THE PREFERRED EMBODIMENTS

Referring now to the drawings, wherein like reference numerals designate identical or corresponding parts throughout the several views, FIG. 1 shows a diagrammatic illustration of a power converter circuit arrangement 1 according to the invention. The latter comprises a plurality (three are illustrated) of power converters or power converter arms 2 which are connected in parallel and are connected to an intermediate circuit 7, in particular a DC voltage intermediate circuit, represented by a capacitance. The power converters 2 or power converter arms 2 comprise a series circuit formed by at least two power semiconductor switches 3. IGBTs having a freewheeling diode connected in parallel therewith are particularly preferred. The corresponding power semiconductor switches 3 of the power converter arms 2 connected in parallel are turned on and off essentially synchronously by a drive circuit (not illustrated). As a result of parameter differences in the drive circuits, the current paths and the switches 3, it is possible, during commutation of the current, for incorrect distribution of the current among the power converter arms 2 to occur as a result of one switch 3 switching earlier than another.

According to the invention, then, a balancing inductor comprising at least one ring-core inductor is connected between the load connections 4 of two adjacent power converters or power converter arms 2. It is also possible to connect a plurality of ring-core inductors in series. The load connections 4 of the adjacent power converter arms 2 are looped through the ring core 5 from different sides and brought together to a common load current connection 6 of all of the parallel power converters or power converter arms. If an unbalance occurs in the switching behavior of the parallel power converters 2, then the ring-core inductors accept the resultant differential voltage between the load connections 4 of the power converters or power converter arms 2. In this way, the parallel power converters 2 are decoupled during the commutation of the load current to or from the freewheeling diodes, and the otherwise occurring incorrect distribution of the arm currents can be reduced to a nondamaging extent.

The ring-core inductors preferably have a nonlinear inductance behavior. That is to say that the inductance becomes smaller and smaller for larger currents. Such a behavior is achieved for example by ring cores 5 which are composed of a soft-magnetic, porous powder composite material. The ring cores 5 may be of annular construction or have another closed form. The air inclusions of the porous material then form a type of air gap. Such a behavior is also achieved by ring cores which are composed of a ring of material of high permeability with an air gap. The ring cores may in this case be composed of a multiplicity of layered sheets.

With the invention, then, an effective uniform distribution of current is achieved, and any incorrect distribution of current that may still remain can be taken up by the ring-core inductors.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power converter circuit arrangement (1) having a plurality of power converters or power converter arms (2) which are connected in parallel to an intermediate circuit (7) and are each equipped with at least two series-connected, essentially synchronously driven power semiconductor switches (3), in particular IGBTs with a freewheeling diode connected in parallel, a central connection of the series circuit formed by the power semiconductor switches forming a load connection (4), and a balancing inductor being connected between the load connections of each two adjacent power converters or power converter arms, wherein the balancing inductor comprises at least one ring core (5) having any desired closed form, the load connections (4) of two adjacent power converters or power converter arms are looped through each ring core (5) from different sides and are brought together to a common load current connection (6) of all of the parallel power converters or power converter arms.

2. The power converter circuit arrangement as claimed in claim 1, wherein the balancing inductor forms an inductance whose value decreases nonlinearly with a larger current.

3. The power converter circuit arrangement as claimed in claim 1, wherein the ring cores (5) are composed of a soft-magnetic, porous powder composite material.

4. The power converter circuit arrangement as claimed in claim 1, wherein the ring cores (5) are composed of a ring of material of high permeability with an air gap.

* * * * *